US011459460B2

(12) United States Patent
Mouazen et al.

(10) Patent No.: US 11,459,460 B2
(45) Date of Patent: Oct. 4, 2022

(54) BITUMEN SOLID AT AMBIENT TEMPERATURE

(71) Applicants: TOTAL MARKETING SERVICES, Puteaux (FR); CENTRE NATIONAL DE LA RECHERCHE SCIENTIFIQUE, Paris (FR)

(72) Inventors: Mouhamad Mouazen, Nanterre (FR); Manuel Merce, Lyons (FR); Véronique Schmitt, Talence (FR); Rénal Backov, Bordeaux-Cauderan (FR)

(73) Assignees: TOTAL MARKETING SERVICE, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 986 days.

(21) Appl. No.: 16/304,250

(22) PCT Filed: May 22, 2017

(86) PCT No.: PCT/FR2017/051262
§ 371 (c)(1),
(2) Date: Nov. 23, 2018

(87) PCT Pub. No.: WO2017/203153
PCT Pub. Date: Nov. 30, 2017

(65) Prior Publication Data
US 2020/0308409 A1   Oct. 1, 2020

(30) Foreign Application Priority Data
May 23, 2016 (FR) ...................................... 1654581

(51) Int. Cl.
C08L 95/00 (2006.01)
C09D 195/00 (2006.01)
E01C 5/12 (2006.01)

(52) U.S. Cl.
CPC ............ *C08L 95/00* (2013.01); *C09D 195/00* (2013.01); *E01C 5/12* (2013.01); *C08L 2207/53* (2013.01); *C08L 2555/34* (2013.01)

(58) Field of Classification Search
None
See application file for complete search history.

(56) References Cited

U.S. PATENT DOCUMENTS

| 3,026,568 | A | 3/1962 | Moar |
| 6,749,678 | B1 | 6/2004 | Reynhout |
| 2011/0290695 | A1 | 12/2011 | Thomas |
| 2012/0123028 | A1 | 5/2012 | Dreesen et al. |
| 2012/0328777 | A1* | 12/2012 | De Amorim Novais Da Costa Nobrega ............ B29C 66/1122 427/212 |
| 2017/0218177 | A1 | 8/2017 | Vincent et al. |

FOREIGN PATENT DOCUMENTS

| FR | 3 024 454 A1 | 2/2016 |
| WO | 2007/058994 A2 | 5/2007 |
| WO | 2008/137394 A1 | 11/2008 |
| WO | 2009/153324 A1 | 12/2009 |
| WO | 2011/013073 A1 | 2/2011 |
| WO | 2012/168380 A1 | 12/2012 |

OTHER PUBLICATIONS

Oyekunle, L.O., "Certain Relationships between Chemical Composition and Properties of Petroleum Asphalts from Different Origin," Oil & Gas Science and Technology, 2006, vol. 61, No. 3, pp. 433-441.
Hubbard et al., "Determination of Asphaltenes, Oils, and Resins in Asphalt," Analytical Chemistry, May 1948, vol. 20, No. 5, pp. 460-465.
Moschopedis et al., "Oxidation of a bitumen," Fuel, Jul. 1975, vol. 54, pp. 210-212.
Babu et al., "Effect of low-temperature oxidation on the composition of Athabasca bitumen," Fuel, Jun. 1984, vol. 63, pp. 858-861.
Nciri et al., "Chemical Characterization of Gilsonite Bitumen," Journal of Petroleum & Environmental Biotechnology, 2014, vol. 5, No. 5, 1000193, pp. 1-10.
Sep. 8, 2017 International Search Report issued in International Patent Application No. PCT/FR2017/051262.
Sep. 8, 2017 Written Opinion of the International Searching Authority issued in International Patent Application No. PCT/FR2017/051262.

* cited by examiner

Primary Examiner — Jeffrey D Washville
(74) Attorney, Agent, or Firm — Oliff PLC

(57) ABSTRACT

Bitumen that is solid at ambient temperature in the form of granules that include a core made of a first bituminous material and a coating made of a second bituminous material, the second bituminous material having a total content of asphaltenes, extracted using n-alkane, of 30% to 50% by weight in relation to the total weight of the bitumen in the coating.

19 Claims, No Drawings

BITUMEN SOLID AT AMBIENT TEMPERATURE

TECHNICAL FIELD

The present invention relates to a road bitumen in divided form, which is solid at ambient temperature. The present invention also relates to a process for preparing road bitumen at ambient temperature and also to the use thereof as road binder, especially for manufacturing bituminous mixes.

The present invention also relates to a process for manufacturing bituminous mixes from solid bitumen according to the invention and also to a process for transporting and/or storing road bitumen that is solid at ambient temperature according to the invention.

PRIOR ART

Bitumen is used in the vast majority in construction, mainly for the manufacture of roadways or in industry, for example in sealing applications, for instance for roofing. It is generally in the form of a black material that is highly viscous, or even solid at ambient temperature, which liquefies on heating.

In general, bitumen is stored and transported hot, in bulk, in tank trucks or by boat at high temperatures of the order of 120° C. to 200° C. However, the storage and transportation of hot bitumen presents certain drawbacks. Firstly, the transportation of hot bitumen in liquid form is considered hazardous and is governed by very strict regulations. This mode of transportation does not present any particular difficulties when the transportation equipment and infrastructures are in good condition. When such is not the case, it may become problematic: if the tank truck is not sufficiently thermally insulated, the viscosity of the bitumen may increase during an excessively long journey. Bitumen delivery distances are thus limited. Secondly, maintaining bitumen at high temperatures in tanks or in tank trucks consumes energy. In addition, maintaining bitumen at high temperatures for a long period may affect the properties of the bitumen and thus change the final performance qualities of the bituminous mix.

To overcome the problems of transporting and storing hot bitumen, conditionings enabling the transportation and storage of bitumens at ambient temperature have been developed. This mode of transporting bitumen under conditioning at ambient temperature represents only a tiny fraction of the amounts transported worldwide, but it meets very real needs for geographical regions that are difficult and expensive to access via conventional transportation means.

An example that may be mentioned of conditioning for cold transportation that is currently used is the conditioning of bitumen at ambient temperature in metal drums. This means is increasingly coming under question from an environmental viewpoint since the bitumen stored in drums must be heated before its use as road binder. However, this operation is difficult to perform for this type of conditioning, and the drums constitute waste after use. Moreover, the storage of bitumen at ambient temperature in drums leads to losses since bitumen is very viscous and part of the product remains on the walls of the drum during transfer into the tanks of the bituminous-mix production units. As regards the manipulation and transportation of bituminous products in these drums, they may prove to be difficult and hazardous if the specialized equipment for handling drums is not available to transporters or at the site of use of the bitumen.

Another example of conditioning that may be mentioned is bitumens in the form of pellets transported and/or stored in bags, which are often used in places where the ambient temperature is high. These pellets have the advantage of being readily manipulable. U.S. Pat. No. 3,026,568 describes bitumen pellets covered with a powdery material, such as limestone powder. However, this type of granular bitumen does not prevent the bitumen from undergoing creep, especially at high ambient temperature.

WO 2009/153324 and WO 2012/168380 describe bitumen pellets composed of a bitumen core covered with a bitumen layer having a penetration at 25° C. of less than 5 dmm. Nevertheless, pellets of this type do not prevent creep of the bitumen constituting the core of the pellets during the storage and/or transportation of the bitumen at high ambient temperature since the shell made of bitumen having a penetration at 25° C. of less than 5 dmm does not sufficiently withstand the numerous shocks during the storage and/or transportation of the bitumen.

US 2011/0290695 describes a system for transporting bitumen in the form of slabs, said slabs being covered with a bituminous film comprising natural bitumen and synthetic polymer gum.

However, it does not describe a bitumen that is solid at ambient temperature in the form of pellets. It does not describe a coating layer made of a bituminous material enriched with asphaltenes either.

The Applicant has thus sought to develop bitumens that are capable of being subjected to transportation and/or storage and/or manipulation conditions at high ambient temperatures without undergoing creep, in particular bitumens in the form of pellets whose adhesion and agglomeration during their transportation and/or storage and/or manipulation at high ambient temperature are reduced relative to the pellets of the prior art.

There is thus a need to provide a road bitumen that is transportable and/or storable and/or manipulable at ambient temperature, for overcoming the drawbacks of the prior art.

FR 3 024 454 describes bitumen pellets comprising at least one chemical additive which addresses the problem of the transportation and/or storage and/or manipulation of road bitumen at ambient temperatures. However, the bitumen used in FR 3 024 454 is not a reconstituted bitumen and, consequently, the user cannot modify its properties for the purpose of optimizing them as a function of its final use.

One object of the present invention is to provide a road bitumen that is transportable and/or storable and/or manipulable at high ambient temperature, and whose properties are conserved over time.

In particular, the aim of the present invention is to provide a road bitumen that is transportable and/or storable for a period of more than two months, preferably three months, and at high ambient temperature, especially at a temperature less than 100° C., preferably from 20° C. to 80° C.

Another object of the invention is to propose a road bitumen that is readily manipulable, especially at high ambient temperature, in particular at a temperature ranging up to 100° C., preferably from 20° C. to 80° C.

In particular, the aim of the present invention is to provide a road bitumen that is readily manipulable after a prolonged period of transportation and/or storage at high ambient temperature, especially for a transportation and/or storage period of more than two months, preferably more than three months, and at a temperature ranging up to 100° C., preferably between 20° C. and 80° C.

One object of the present invention is to provide a road bitumen in a form which allows its flow in solid form at ambient temperature, so as to be able to manipulate it without loss of material. It has been sought to provide a road bitumen which is in a form enabling it to be conditioned in a packaging, to remove it from the conditioning and to transfer it into equipment, even at a high ambient temperature, without the need to heat it, and without loss of material. The bitumen proposed is in divided and solid form at ambient temperature, and as such it satisfactorily solves the problems mentioned above.

Another object of the present invention is to provide a road bitumen that is transportable and/or storable and/or manipulable at high ambient temperature, and whose properties are conserved over time and whose composition may be modified beforehand as a function of its final use.

Another object is to propose an economical industrial process for manufacturing road bitumen that is transportable and/or storable at ambient temperature.

Another object of the invention is to propose an economical industrial process for manufacturing bituminous mixes from road bitumen that is transportable and/or storable at ambient temperature.

Another object of the invention is to propose an economical and ecological process for transporting and/or storing and/or manipulating road bitumen at ambient temperature, making it possible to avoid the use of additional means for maintaining said bitumen at elevated temperature during transportation and/or storage and/or manipulation and making it possible to minimize the presence of waste and/or residues.

SUMMARY OF THE INVENTION

The invention relates to a bitumen that is solid at ambient temperature in the form of pellets comprising a core made of a first bituminous material and a coating layer made of a second bituminous material, in which the second bituminous material comprises asphaltenes in a content ranging from 30% to 50% by weight relative to the total weight of the coating layer.

The invention also relates to a process for manufacturing a solid bitumen as defined above and below, this process comprising:
i) the forming of the core from at least one first bituminous material,
ii) the forming of the coating layer from the second bituminous material on all or part of the surface of the core.

The invention also relates to a bitumen that is solid at ambient temperature as defined above and which may be obtained by performing the process of the invention.

According to a preferred embodiment, the second bituminous material has a needle penetrability measured at 25° C. according to the standard EN 1426 of greater than $5\frac{1}{10}$ mm, preferably ranging from 6 to $50\frac{1}{10}$ mm, preferably from 6 to $40\frac{1}{10}$ mm.

According to a preferred embodiment, the second bituminous material is a bitumen base supplemented with asphaltenes that are insoluble in n-alkanes.

According to a more preferred embodiment, the amount of asphaltenes that are insoluble in n-alkanes added to the bitumen base to form the second bituminous material represents from 5% to 30% by weight and preferably from 10% to 30% by weight relative to the total weight of the second bituminous material.

According to an even more advantageous embodiment, the asphaltenes added to the bitumen base are insoluble in n-pentane.

According to a preferred embodiment, the first bituminous material has a needle penetrability measured at 25° C. according to the standard EN 1426 of from 50 to $330\frac{1}{10}$ mm, preferably from 50 to $220\frac{1}{10}$ mm.

According to a preferred embodiment, the first bituminous material is chosen from a maltenic fraction, a bitumen base, and mixtures thereof.

According to a preferred embodiment, the bitumen of the invention that is solid at ambient temperature shows stability on transportation and storage at a temperature ranging from 20 to 80° C. for a period of more than or equal to two months, preferably more than or equal to three months.

Another subject of the invention is the use of the solid bitumen as defined above as a road binder.

Advantageously, the solid bitumen is used for the manufacture of bituminous mixes.

The invention also relates to a process for manufacturing bituminous mixes comprising at least one road binder and granulates, the road binder being chosen from the solid bitumens as defined above; this process comprises at least the steps of:
heating the granulates to a temperature ranging from 100° C. to 180° C., preferably from 120° C. to 160° C.,
mixing the granulates with the road binder in a tank such as a mixer or a mixing drum,
obtaining bituminous mixes.

According to a preferred embodiment of this process, it does not include a step of heating the road binder before it is mixed with the granulates.

The invention also relates to a process for transporting and/or storing road bitumen, said road bitumen being transported and/or stored in the form of bitumen that is solid at ambient temperature as defined above.

DETAILED DESCRIPTION

The objectives that the Applicant set itself have been achieved by means of the development of bitumen compositions in a divided form, having a core/envelope structure, in which the core is based on a first bituminous material and the coating layer based on a second bituminous material. The choice of the material compositions constituting the core and the envelope gives the overall structure improved properties relative to the pellets of bitumens known in the prior art.

A first object of the invention relates to a bitumen that is solid at ambient temperature in the form of pellets comprising a core made of a first bituminous material and a coating layer made of a second bituminous material. The second bituminous material forming the coating layer has a total content of asphaltenes of between 30% and 50% by weight relative to the total weight of the bitumen in the coating layer. This content of asphaltenes is greater than that present in the majority of bitumen bases. These asphaltenes are advantageously obtained from a bitumen base by extraction with an n-alkane. The asphaltenes form the extraction residue that is insoluble in the n-alkane.

The term "n-alkane" means a saturated linear alkane comprising from 3 to 10 carbon atoms and preferably from 3 to 8 carbon atoms. It may be envisaged to perform an extraction in steps, with a first alkane for a first extraction and then with a second alkane for a second extraction. Even more preferentially, the n-alkane is chosen from C5 to C7 alkanes. Advantageously, the n-alkane used according to the invention is n-pentane.

The term "ambient temperature" means the temperature resulting from the climatic conditions under which the road bitumen is transported and/or stored. More precisely, ambient temperature is equivalent to the temperature reached during the transportation and/or storage of the road bitumen, it being understood that the ambient temperature implies that no heat is supplied other than that resulting from the climatic conditions.

The invention relates to bitumens that can be subjected to a high ambient temperature, in particular a temperature ranging up to 100° C., preferably from 20° C. to 80° C.

The term "bitumen that is solid at ambient temperature" means a bitumen which has a solid appearance at ambient temperature irrespective of the transportation and/or storage conditions. More precisely, the term "bitumen that is solid at ambient temperature" means a bitumen which conserves its solid appearance throughout the transportation and/or storage at ambient temperature, i.e. a bitumen which does not undergo creep at ambient temperature under its own weight and, moreover, which does not undergo creep when it is subjected to pressure forces arising from the transportation and/or storage conditions.

The term "core made of a bituminous material" means a core which is formed from at least one bituminous material. Preferably, the bituminous material is chosen from a maltenic fraction, a bitumen base, and mixtures thereof.

The term "coating layer" means a homogeneous layer covering all or part of the surface of the core. More precisely, this means that the coating layer covers at least 90% of the surface of the core, preferably at least 95% of the surface of the core, more preferentially at least 99% of the surface of the core.

The term "coating layer made of bitumen" means a homogenous coating layer which is formed with one or more bitumen bases and which has a total content of asphaltenes of between 30% and 50% by weight relative to the total weight of the coating layer. Certain bitumen bases are naturally rich in asphaltenes, others are supplemented to reach an asphaltene content of 30% to 50% by weight.

The term "asphaltenes extracted with an n-alkane" means petroleum fractions, obtained from a bitumen base by extraction using an n-alkane and which are insoluble in the n-alkane. Advantageously, the asphaltenes according to the invention are insoluble in n-pentane. For the purposes of the invention, the asphaltenes that are insoluble in n-pentane may also be referred to as "asphaltenes extracted with n-pentane".

The asphaltenes have a viscosity-enhancing function in the bitumen. Consequently, modifying their concentration in a bitumen makes it possible to vary the viscosity of the bitumen in a controlled manner.

The term "consists essentially of" followed by one or more features means that, besides the components or steps specifically listed, components or steps which do not significantly modify the properties and features of the invention may be included in the process or the material of the invention.

The Bitumen Bases

In the present invention, a bitumen base, or a product derived from a bitumen base, such as a maltenic fraction, is used for the preparation of the first bituminous material. A bitumen base is used for the preparation of the second bituminous material. The same bitumen base or different bitumen bases may be used for the formulation of the two bituminous materials. For the purposes of the invention, the terms "bitumen" and "road bitumen" are used equivalently and independently of each other. The term "bitumen" or "road bitumen" means any bituminous composition constituted by one or more bitumen bases, said compositions being intended for a road application.

Among the bitumen bases that may be used according to the invention, mention may be made first of bitumens of natural origin, those contained in deposits of natural bitumen, of natural asphalt or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes or pitches. The bitumen bases may be obtained via conventional processes for manufacturing bitumen bases at a refinery, in particular by direct distillation and/or vacuum distillation of oil. These bitumen bases may optionally be viscosity-reduced and/or de-asphalted and/or air-rectified. It is common practice to perform vacuum distillation on the atmospheric residues originating from the atmospheric distillation of crude oil. This manufacturing process consequently corresponds to the succession of atmospheric distillation and vacuum distillation, the charge feeding the vacuum distillation corresponding to the atmospheric residues. These vacuum residues derived from the vacuum distillation tower may also be used as bitumens. It is also common practice to inject air into a charge usually composed of distillates and of heavy products originating from the vacuum distillation of atmospheric residues originating from oil distillation. This process makes it possible to obtain a blown or semi-blown or air-oxidized or air-rectified or partially air-rectified base.

The various bitumen bases obtained via the refining processes may be combined together to obtain the best technical compromise. The bitumen base may also be a recycling bitumen base.

According to the invention, for the conventional processes for manufacturing bitumen bases, the process is performed at manufacturing temperatures of between 100° C. and 200° C., preferably between 140° C. and 200° C., more preferentially between 140° C. and 170° C., and with stirring for a time of at least 10 minutes, preferably between 30 minutes and 10 hours, more preferentially between 1 hour and 6 hours.

The term "manufacturing temperature" means the temperature of heating of the bitumen base(s) before mixing and also the mixing temperature. The heating time and temperature vary according to the amount of bitumen used and are defined by the standard NF EN 12594.

According to the invention, blown bitumens may be manufactured in a blowing unit, by passing a stream of air and/or oxygen through a starting bitumen base. This operation may be performed in the presence of an oxidation catalyst, for example orthophosphoric acid. The blowing is generally performed at high temperatures, of the order of 200 to 300° C., for relatively long times typically between 30 minutes and 2 hours, continuously or in batches. The blowing time and temperature are adjusted as a function of the properties targeted for the blown bitumen and as a function of the quality of the starting bitumen.

The Core Made of Bituminous Material

According to the invention, the nucleus or core of the solid bitumen pellets is composed of at least one first bituminous material.

Preferably, the bituminous part is chosen from a maltenic fraction, a bitumen base, and mixtures thereof.

The term "maltenic fraction" means a petroleum fraction, initially present in a bitumen base, which is soluble in n-alkanes. Advantageously, the maltenic fraction used according to the invention is soluble in n-pentane. For the purposes of the invention, the maltenic fraction which is soluble in n-pentane may also be referred to as "maltenes extracted with n-pentane".

According to a particular embodiment, the maltenic fraction is extracted with n-pentane from a bitumen base.

Preferably, when the first bituminous material is a maltenic fraction, it comprises a maltene content of greater than or equal to 60% by mass, preferably greater than or equal to 70% by weight relative to the total weight of the first bituminous material.

Preferentially, the first bituminous material, used for manufacturing the core of the pellets of the invention, has a needle penetrability measured at 25° C. according to the standard EN 1426 of from 20 to 330 1/10 mm, preferably from 50 to 220 1/10 mm.

In a known manner, the measurement known as the "needle penetrability" is performed by means of a standardized test NF EN 1426 at 25° C. ($P_{25}$). This penetrability feature is expressed in tenths of a millimeter (dmm or 1/10 mm). The needle penetrability, measured at 25° C. according to the standardized test NF EN 1426, represents the measurement of the penetration into a bitumen sample, after a time of 5 seconds, of a needle whose weight with its support is 100 g. The standard NF EN 1426 replaces the homologated standard NFT 66-004 of December 1986 with effect from 20 Dec. 1999 (decision of the General Director of AFNOR dated 20 Nov. 1999).

According to a particular embodiment, the first bituminous material comprises at least one bitumen base.

According to another particular embodiment, the first bituminous material comprises at least one maltenic fraction.

According to another particular embodiment, the first bituminous material comprises at least one maltenic fraction and at least one bitumen base. In this embodiment, the content of maltenic fraction advantageously represents from 10% to 90% by weight and preferably from 20% to 80% by weight relative to the total weight of the first bituminous material.

According to this variant, the maltenes may have been obtained from the same bitumen base as that used in the formulation of the first bituminous material. They may also have been obtained from a bitumen base other than that used in the formulation of the first bituminous material.

According to one embodiment of the invention, the bituminous material forming the core of the pellets according to the invention may also comprise at least one known bitumen elastomer such as SB copolymers (copolymer containing styrene and butadiene blocks), SBS copolymers (copolymer containing styrene-butadiene-styrene blocks), SIS (styrene-isoprene-styrene) copolymers, SBS* copolymers (copolymer containing styrene-butadiene-styrene star blocks), SBR (styrene-b-butadiene-rubber) copolymers and EPDM (ethylene propylene diene modified) copolymers. These elastomers may also be crosslinked according to any known process, for example with sulfur. Mention may also be made of elastomers prepared from styrene monomers and butadiene monomers allowing crosslinking without a crosslinking agent, as described in WO 2007/058994 and WO 2008/137394 and by the Applicant in patent application WO 11/013073.

The Coating Layer Made of Bituminous Material

According to one embodiment of the invention, the coating layer is made of a second bituminous material which has a total content of asphaltenes ranging from 30% to 50% by weight relative to the total weight of the second bituminous material. The coating layer is solid at ambient temperature, including at high ambient temperature.

According to one embodiment of the invention, the second bituminous material forming the coating layer has a needle penetrability measured at 25° C. according to the standard EN 1426 of greater than 5 1/10 mm, preferably ranging from 6 to 50 1/10 mm, preferably from 6 to 40 1/10 mm.

According to one embodiment of the invention, the second bituminous material forming the coating layer is composed of a bitumen base supplemented with asphaltenes. Advantageously, these asphaltenes have been extracted with an n-alkane, preferably extracted with n-pentane.

Preferably, the content of asphaltenes extracted with an n-alkane, preferentially with n-pentane, added to the bitumen base represents from 5% to 30% by weight, preferably from 10% to 30% by weight relative to the total weight of the second bituminous material.

The bitumen base itself usually comprises asphaltenes; the addition of asphaltene in addition to those already present in the bitumen base modifies the penetrability and viscosity properties of the original bitumen base.

The term "bitumen supplemented with asphaltenes extracted with an n-alkane" means an original bitumen base to which a supplementary content of asphaltenes extracted with an n-alkane is added.

More preferentially, the term "bitumen supplemented with asphaltenes extracted with n-pentane" means an original bitumen base to which a supplementary content of asphaltenes extracted with n-pentane is added.

The asphaltenes may have been obtained from the same bitumen base as that used in the formulation of the second bituminous material. They may have been obtained from a bitumen base other than that used in the formulation of the second bituminous material.

Advantageously, the second bituminous material is obtained by placing a bitumen base in contact with asphaltenes extracted with an n-alkane, preferably with n-pentane, and heating at 200° C. for a time of between 10 minutes and 2 hours, preferably under an inert atmosphere. The composition thus obtained is homogenized for a time of between 5 minutes and 20 minutes, and then left to stand at ambient temperature for a time of between 15 minutes and 45 minutes.

The term "original bitumen base" means a bitumen base not supplemented with asphaltenes extracted with an n-alkane, especially with n-pentane.

When a bitumen has a total content of asphaltenes of less than 30%, said bitumen has a tacky appearance at ambient temperature and, consequently, does not make it possible to obtain solid bitumen in the form of pellets that are readily manipulable during storage and/or transportation at high ambient temperature since these pellets adhere together.

When a bitumen has a total content of asphaltenes of greater than 50%, said bitumen does not form a homogeneous composition as a result of its excessively high content of asphaltenes. Consequently, bitumen with a total content of asphaltenes of greater than 50% cannot be formed into a coating layer.

According to a preferred embodiment, the second bituminous material of which the coating layer is composed is constituted essentially of bitumen with a total content of asphaltenes of between 30% and 50% by weight relative to the total weight of the second bituminous material.

The Pellets:

According to the invention, the bitumen that is solid at ambient temperature is conditioned in a divided form, i.e. in the form of small-sized units, referred to as pellets or particles, including a core based on a bituminous material and an envelope or shell or covering or coating layer or coating.

Preferably, the solid bitumen pellets according to the invention may have, within the same population of pellets, one or more shapes chosen from a cylindrical, spherical or ovoid shape. The size of the bitumen pellets is such that the longest mean dimension is preferably less than or equal to 30 mm, more preferentially from 5 to 30 mm and even more preferentially from 5 to 20 mm. The size and shape of the bitumen pellets may vary according to the manufacturing process employed. For example, the use of a die makes it possible to control the manufacture of pellets of a chosen size. Screening makes it possible to select pellets as a function of their size.

Preferably, the bitumen pellets according to the invention have a weight of between 1 mg and 5 g, preferably between 10 mg and 4 g and more preferentially between 50 mg and 2 g.

Without being bound to the theory, the Applicant has discovered, unexpectedly, that the content of asphaltenes extracted from n-alkane, preferably from n-pentane, of between 30% and 50% by weight relative to the total weight of the second bituminous material according to the invention makes it possible to obtain a coating layer:
- which is resistant to climatic conditions and to the transportation and/or storage conditions of the solid road bitumen,
- which breaks easily under the effect of mechanical shear, for instance under the effect of mechanical shear applied in a tank such as a mixer or a mixing drum during the manufacture of bituminous mixes,
- which liquefies easily on contact with the hot granulates used during the manufacture of bituminous mixes.

More particularly, the coating layer withstands the transportation and/or storage of the bitumen at ambient temperature in "big bags" while at the same time being suitable for the manufacture of bituminous mixes. It allows the release of the core made of bituminous material during the manufacture of bituminous mixes under the effect of mechanical shear and/or by liquefying on contact with the hot granulates.

According to a particularly preferred embodiment of the invention, the solid bitumen has:
- a core made of a first bituminous material, and
- a coating layer made of a second bituminous material having a total content of asphaltenes extracted from n-alkane, preferably from n-pentane, ranging from 30% to 50% by weight relative to the total weight of the second bituminous material.

More preferably, the solid bitumen has:
- a core made of a first bituminous material chosen from a maltenic fraction, a bitumen base, and mixtures thereof, and
- a coating layer made of a second bituminous material comprising a bitumen base supplemented with asphaltenes extracted from n-alkane, preferably from n-pentane, and having a total content of asphaltenes ranging from 30% to 50% by weight relative to the total weight of the bitumen of the coating layer.

According to an even more advantageous embodiment, the solid bitumen is essentially constituted of:
- a core constituted of a first bituminous material, and
- a coating layer constituted of a second bituminous material comprising a bitumen base and having a total content of asphaltenes ranging from 30% to 50% by weight relative to the total weight of the second bituminous material.

Process for Manufacturing the Pellets:

Another subject of the invention relates to a process for manufacturing a bitumen that is solid at ambient temperature in the form of pellets composed of a core made of a first bituminous material and of a coating layer of the core made of a second bituminous material, this process comprising:
i) the forming of the core from the first bituminous material,
ii) the forming of the coating layer from the second bituminous material on all or part of the surface of the core.

Preferably, the forming step ii) is performed by dipping, spraying, coextrusion, etc.

The forming of the core of the pellets according to the invention from at least one first bituminous material may be performed according to any known process, for example according to the manufacturing process described in U.S. Pat. No. 3,026,568, WO 2009/153324 or WO 2012/168380. According to a particular embodiment, the forming of the solid bitumen core may be performed by draining, in particular with the aid of a drum.

Other techniques may be used in the process for manufacturing the solid bitumen core, in particular molding, pelletizing, extrusion, etc.

Preferably, the particles of solid bitumen core have a longest mean dimension ranging from 1 to 20 mm, advantageously from 4 to 15 mm.

Another subject of the invention is a bitumen that is solid at ambient temperature in the form of pellets that may be obtained by performing the process according to the invention as described above. Such a solid bitumen in the form of pellets advantageously has the properties described above.

Use of the Solid Bitumen Pellets:

Another subject of the invention also relates to the use of the pellets of bitumen that is solid at ambient temperature according to the invention, as road binder.

The road binder may be employed for manufacturing bituminous mixes, in combination with granulates according to any known process.

Preferably, the bitumen that is solid at ambient temperature according to the invention is used for the manufacture of bituminous mixes.

Bituminous mixes are used as materials for the construction and maintenance of road foundations and of their coating, and also for performing all roadway works. Examples that may be mentioned include surface dressings, hot bituminous mixes, cold bituminous mixes, cold cast bituminous mixes, emulsion gravels, base courses, tie coats, tack coats and wearing courses, and other combinations of a bituminous binder and of the road granulate having particular properties, such as rutting-resistant courses, draining bituminous mixes, or asphalts (mixture between a bituminous binder and granulates such as sand).

Preferentially, a bituminous mix comprises:
- from 3% to 10% by mass of a bituminous binder, and
- from 90% to 97% by mass of granulates, the percentages being expressed relative to the total mass of the bituminous mix.

For the purposes of the invention, the term "granulates" means mineral charges such as fines, sand or gravel, but also synthetic charges.

The mineral charges are constituted of fines or fillers (particles less than 0.063 mm in size), sand (particles between 0.063 mm and 2 mm in size) and optionally gravel (particles greater than 2 mm in size, preferably between 2 mm and 4 mm).

The fines or fillers, sands and gravels are granulates preferably corresponding to the specifications of the standard NF EN 13043. A granulate may be natural, artificial or recycled. Natural granulate is a granulate of mineral origin which has not undergone any transformation other than mechanical. Artificial granulate is a granulate of mineral origin resulting from an industrial process comprising thermal or other transformations. Granulates are generally referred to in terms of the lower dimension (d) and the upper dimension (D) of 25 screens, expressed in the form "d/D" corresponding to the granular category. This designation acknowledges that some grains can be retained on the upper screen (retained over D) and that others can pass through the lower screen (passing at d). Granulates are grains with dimensions of between 0 and 125 mm. Fines and similarly fillers are a granular fraction of a granulate which passes through the 0.063 mm screen. Filler is a granulate for which most of the grains pass through the 0.063 mm screen and which may be added to construction materials to give them certain properties. Sands are 0/2 granulates according to the standard NF EN 13043 for bituminous mixes. Gravels are granulates for which d>2 mm and D<45 mm according to the standard NF EN 13043 for bituminous mixes and dressings.

According to the invention, the fines are of any mineral nature. They are preferably chosen from fillers of limestone type. The particle size of the fines according to the invention is preferably less than 63 μm.

According to the invention, the sands are preferably chosen from semi-crushed or rolled sands. The particle size of the sands according to the invention is preferably between 63 μm and 2 mm.

According to the invention, the gravels are chosen from gravels of any geological nature with a density of greater than 1.5. Preferably, the particle size of the gravels according to the invention is between 2 mm and 14 mm. The gravels are preferably chosen from the particle sizes 2/6, 4/6, 6/10 and 10/14.

Another subject of the invention relates to a process for manufacturing bituminous mixes comprising at least one road binder and granulates, the road binder being the solid bitumen according to the invention, this process comprising at least the steps of:

heating the granulates to a temperature ranging from 100° C. to 180° C., preferably from 120° C. to 160° C.,
mixing the granulates with the road binder in a tank such as a mixer or a mixing drum,
obtaining bituminous mixes.

The process of the invention has the advantage of being able to be performed without a preliminary step of heating the solid bitumen pellets.

The process for manufacturing bituminous mixes according to the invention does not require a step of heating of the solid bitumen pellets before mixing with the granulates, since, on contact with the hot granulates, the bitumen that is solid at ambient temperature melts.

The bitumen that is solid at ambient temperature according to the invention as described above has the advantage of being able to be added directly to the hot granulates, without having to be melted prior to mixing with the hot granulates.

Preferably, the step of mixing of the granulates and of the road binder is performed with stirring, and stirring is then maintained for not more than 5 minutes, preferably not more than 1 minute to allow the production of a homogeneous mixture.

The solid bitumen in the form of pellets according to the present invention is noteworthy in that it allows the transportation and/or storage of road bitumen at ambient temperature under optimum conditions, in particular without there being any agglomeration and/or adhesion of the solid bitumen during its transportation and/or its storage, even when the ambient temperature is high. Moreover, the coating layer of the pellets breaks under the effect of the contact with the hot granulates and of shear, and it releases the bitumen base. Finally, the presence of the coating layer in the mixture of road binder and of granulates makes it possible to adjust the properties of said road bitumen as a function of the road application, when compared with an uncoated bitumen base.

Process for Transporting and/or Storing and/or Manipulating Road Bitumen

Another subject of the invention also relates to a process for transporting and/or storing and/or manipulating road bitumen, said road bitumen being transported and/or stored and/or manipulated in the form of bitumen pellets that are solid at ambient temperature.

Preferably, the road bitumen is transported and/or stored at a high ambient temperature for a period of more than or equal to 2 months, preferably 3 months.

Preferably, the high ambient temperature is from 20° C. to 90° C., preferably from 20° C. to 80° C., more preferentially from 40° C. to 80° C. and even more preferentially from 40° C. to 60° C.

The bitumen pellets according to the invention have the advantage of conserving their divided form, and thus of being able to be manipulated, after storage and/or transportation at a high ambient temperature. They in particular have the capacity of flowing under their own weight without undergoing creep, which allows them to be stored in conditioning in bags, drums or containers of all forms and of all volumes, followed by their transfer from this conditioning into equipment, such as worksite equipment (tank, mixer, etc.).

The bitumen pellets are preferably transported and/or stored in bulk in 1 kg to 100 kg or 500 kg to 1000 kg bags commonly known in the field of road bitumens as "big bags", said bags preferably being made of hot-melt material. They may also be transported and/or stored in bulk in 5 kg to 30 kg cartons or in 100 kg to 200 kg drums.

The various embodiments, variants, preferences and advantages described above for each of the subjects of the invention apply to all the subjects of the invention and may be taken separately or in combination.

The invention is illustrated by the following examples, which are given without any implied limitation.

EXAMPLES

Materials and Methods

The rheological and mechanical features of the bitumens to which reference is made in these examples are measured in the manner indicated in table 1.

TABLE 1

| Property | Abbreviation | Unit | Measuring standard |
|---|---|---|---|
| Needle penetrability at 25° C. | $P_{25}$ | 1/10 mm | NF EN 1426 |
| Ring and ball softening point | RBSP | ° C. | NF EN 1427 |

The variation in ring and ball softening point (RBSP) of said composition is measured according to the standard NF EN 1427 between the sample extracted from the top part of the sample tube and the sample extracted from the bottom part of the sample tube.

Bitumen bases $B_2$ and $B_3$ are prepared using:

a bitumen base of grade 35/50, denoted $B_1$, having a penetrability $P_{25}$ of 43¹/₁₀ mm and an RBSP of 51° C. and commercially available from the Total group under the brand name Azalt®;

asphaltenes extracted with n-pentane;

maltenes extracted with n-pentane.

Protocol for extracting asphaltenes and maltenes extracted with n-pentane 10 g of the bitumen base $B_1$ are deposited in a beaker and 400 mL of n-pentane are added to this beaker. The whole is stirred for 12 hours and this mixture is then filtered by Büchner filtration on 3 μm filters.

2.5 g of filtration residue composed of asphaltenes and referred to as "asphaltenes extracted with n-pentane" are obtained. The filtrate is then evaporated under vacuum to give 7.5 g of evaporation residue composed of maltenes and referred to as "maltenes extracted with n-pentane".

The mass percentage amounts used for each bitumen are indicated in table 2 below.

TABLE 2

| Bitumen | $B_2$ | $B_3$ |
| --- | --- | --- |
| Bitumen base $B_1$ | 80% | — |
| Asphaltenes extracted with n-pentane | 20% | — |
| Maltenes extracted with n-pentane | — | 100% |
| P25 (¹/₁₀ mm) | 6-40 | 220-330 |

The bitumens are prepared in the following manner:

For bitumen $B_2$, 1.25 g of asphaltenes extracted with n-pentane are added at ambient temperature to 5 g of bitumen base $B_1$. The whole is then heated at 200° C. under a stream of argon for 30 minutes. The mixture thus obtained is homogenized by spatula for 5 minutes and then left again without stirring for a further 25 minutes.

The bituminous material $B_3$ corresponds to 2 g of maltenes extracted with n-pentane.

1. Preparation of the Solid Bitumen Pellets $G_1$, $G_2$ and $G_3$ 1.1 General Method for Preparing the Bitumen Pellets According to the Invention Bitumen base $B_2$ is heated at 160° C. for 2 hours in an oven before being poured into a silicone mold having various spherical holes. Bitumen base $B_2$, heated beforehand, is poured into the molds, and imprints are then applied directly on the molds filled with bitumen so as to obtain bitumen coating layers in the form of a hollow half-sphere. After having observed the solidification of the bitumen in the mold, the surplus is leveled off using a blade heated with a Bunsen burner. After 30 minutes, the coating layer formed is removed from the mold. The coating layer made of bitumen is then allowed to cool to ambient temperature for 10 to 15 minutes.

Each of the coating layers of solid bitumen in the form of a hollow half-sphere is then filled at ambient temperature with the bituminous material $B_3$. The half-spheres thus filled are then sealed in pairs using a preheated spatula so as to obtain a bitumen that is solid at ambient temperature in the form of pellets according to the invention comprising a bitumen core and a bitumen coating layer.

Three solid bitumen pellets $G_1$, $G_2$ and $G_3$ according to the invention were prepared according to the general method 1.1 described above. The compositions of these pellets are described in table 3:

TABLE 3

|  | $G_1$ | $G_2$ | $G_3$ |
| --- | --- | --- | --- |
| Mass of the coating layer | 2.36 g | 2.19 g | 2.43 g |
| Mass of the core | 2.24 g | 1.88 g | 1.46 g |

The solid bitumen pellets $G_1$, $G_2$ and $G_3$ according to the invention have a size of between 10 mm and 30 mm.

2. Test of Resistance to Ambient Temperature of the Solid Bitumens $G_1$, $G_2$ and $G_3$ According to the Invention This test is performed in order to evaluate the resistance to ambient temperature of the pellets $G_1$ to $G_3$ at a temperature of 40° C. Specifically, this test makes it possible to simulate the temperature conditions of the pellets to which they are subjected during bulk transportation and/or storage in 10 to 100 kg bags or in 500 to 1000 kg big bags or in 200 kg drums and to evaluate their strength under these conditions.

The test of resistance to ambient temperature at 40° C. is performed by placing the pellets according to the invention in a metal container placed inside a heat chamber set at a temperature of 40° C. for 15 days. The observations are collated in table 4 below.

TABLE 4

| Pellets | $G_1$ | $G_2$ | $G_3$ |
| --- | --- | --- | --- |
| Ambient temperature resistance at 40° C. | +++ | +++ | +++ |

+++: the pellets keep their initial shape and do not adhere together.
++: the pellets do not adhere together, but no longer have their rounded shape.
+: the pellets adhere together slightly.
−: the pellets are quite molten.
−−: the pellets are molten.

The pellets $G_1$, $G_2$ and $G_3$ according to the invention show very good resistance to an ambient temperature of 40° C. insofar as they do not adhere together and they keep their initial shape. Thus, the manipulation and transportation/storage of said pellets $G_1$, $G_2$ and $G_3$ will be easy insofar as the pellets do not melt and do not agglomerate together at high ambient temperature.

The invention claimed is:

1. A bitumen that is solid at ambient temperature in the form of pellets comprising a core made of a first bituminous material and a coating layer made of a second bituminous material, wherein the second bituminous material comprises asphaltenes in a content ranging from 30% to 50% by weight relative to the total weight of the coating layer, wherein the second bituminous material is a bitumen base supplemented with asphaltenes that are insoluble in n-alkanes and the amount of asphaltenes that are insoluble in n-alkanes added to the bitumen base to form the second bituminous material represents from 5% to 30% by weight relative to the total weight of the second bituminous material.

2. The bitumen as claimed in claim 1, wherein the second bituminous material has a needle penetrability measured at 25° C. according to the standard EN 1426 of greater than 5¹/₁₀ mm.

3. The bitumen as claimed in claim 2, wherein the second bituminous material has a needle penetrability measured at 25° C. according to the standard EN 1426 ranging from 6 to 50¹/₁₀ mm.

4. The bitumen as claimed in claim 3, wherein the second bituminous material has a needle penetrability measured at 25° C. according to the standard EN 1426 ranging from 6 to 40¹/₁₀ mm.

5. The bitumen as claimed in claim 1, wherein the amount of asphaltenes that are insoluble in n-alkanes added to the bitumen base to form the second bituminous material represents from 10% to 30% by weight relative to the total weight of the second bituminous material.

6. The bitumen as claimed in claim 1, wherein the asphaltenes added to the bitumen base are insoluble in n-pentane.

7. The bitumen as claimed in claim 1, wherein the second bituminous material is constituted essentially of bitumen with a total content of asphaltenes of between 30% and 50% by weight relative to the total weight of the second bituminous material.

8. The bitumen as claimed in claim 1, wherein the first bituminous material has a needle penetrability measured at 25° C. according to the standard EN 1426 of from 50 to 330 1/10 mm.

9. The bitumen as claimed in claim 8, wherein the first bituminous material has a needle penetrability measured at 25° C. according to the standard EN 1426 of from 50 to 220 1/10 mm.

10. The bitumen as claimed in claim 1, wherein the first bituminous material is chosen from a maltenic fraction, a bitumen base, and mixtures thereof.

11. The bitumen as claimed in claim 10, wherein the first bituminous material is a maltenic fraction, and it comprises a maltene content of greater than or equal to 60% by mass.

12. The bitumen as claimed in claim 10, wherein the first bituminous material comprises at least one maltenic fraction and at least one bitumen base, and the content of maltenic fraction represents from 10% to 90% by weight relative to the total weight of the first bituminous material.

13. A process for manufacturing a solid bitumen as claimed in claim 1, this process comprising:
  i) the forming of the core from at least one first bituminous material,
  ii) the forming of the coating layer from the second bituminous material on all or part of the surface of the core.

14. The bitumen that is solid at ambient temperature as claimed in claim 1, which is obtained by performing a process comprising:
  i) the forming of the core from at least one first bituminous material,
  ii) the forming of the coating layer from the second bituminous material on all or part of the surface of the core.

15. The bitumen that is solid at ambient temperature as claimed in claim 1, which shows stability on transportation and storage at a temperature ranging from 20 to 80° C. for a period of more than or equal to two months.

16. The bitumen that is solid at ambient temperature as claimed in claim 15, which shows stability on transportation and storage at a temperature ranging from 20 to 80° C. for a period of more than or equal to three months.

17. The bitumen as claimed in claim 1 which is a road binder.

18. A process for transporting and/or storing road bitumen, wherein said process comprises
  a step consisting in the preparation of the road bitumen in the form of bitumen pellets according to claim 1, and,
  a step wherein said road bitumen in the form of bitumen pellets is transported and/or stored.

19. The bitumen as claimed in claim 8, wherein the first bituminous material has a needle penetrability measured at 25° C. according to the standard EN 1426 of from 220 to 330 1/10 mm.

* * * * *